E. SZÖCS.
BURNER FOR CLAY KILNS.
APPLICATION FILED AUG. 28, 1913.

1,104,017.

Patented July 21, 1914.

WITNESSES:

INVENTOR
Eugen Szöcs
by Christy and Christy
Atty's

UNITED STATES PATENT OFFICE.

EUGEN SZÖCS, OF BUDAPEST, AUSTRIA-HUNGARY.

BURNER FOR CLAY-KILNS.

1,104,017.

Specification of Letters Patent. Patented July 21, 1914.

Application filed August 28, 1913. Serial No. 787,198.

*To all whom it may concern:*

Be it known that I, EUGEN SZÖCS, a subject of the King of Hungary, and residing at V. Géza Utcza 3, Budapest, Austria-Hungary, have invented certain new and useful Improvements in Burners for Clay-Kilns, of which the following is a specification.

The present invention relates to improvements in burners for clay kilns, which improvements assure the proper mixing of the gas and the air and allow a precise regulation of such mixture by means of a simple and inexpensive mechanism.

According to the invention the gas enters the mixing chamber of the burner in the form of a stream of annular cross section, whereby the gas expands and acquires a whirling motion through the action of slits arranged on one wall of the gas-leading channel. By this whirling motion the gas becomes well mixed with the two air streams sucked into the burner by the gas itself. One of these two air streams is sucked into the interior of the gas stream and is concentric with the gas stream whereas the other air stream is sucked into the outer surface of the gas stream.

The mixture of gas and air can be regulated very precisely because only that air stream which is sucked to the outer surface of the gas stream, and which we will call the outer air stream, is led through the regulating distributer, whereas the air stream sucked into the interior of the gas stream, which we will call the inner air stream, does not change at all in its cross section. As the gas stream flows parallel with the inner air stream, the latter will be sucked in under very favorable conditions so that a sufficient quantity of combustion air will be supplied to the burner even at a very low pressure of the gas.

The accompanying drawing shows one of the features of the burner forming the subject matter of the invention.

Figure 1:
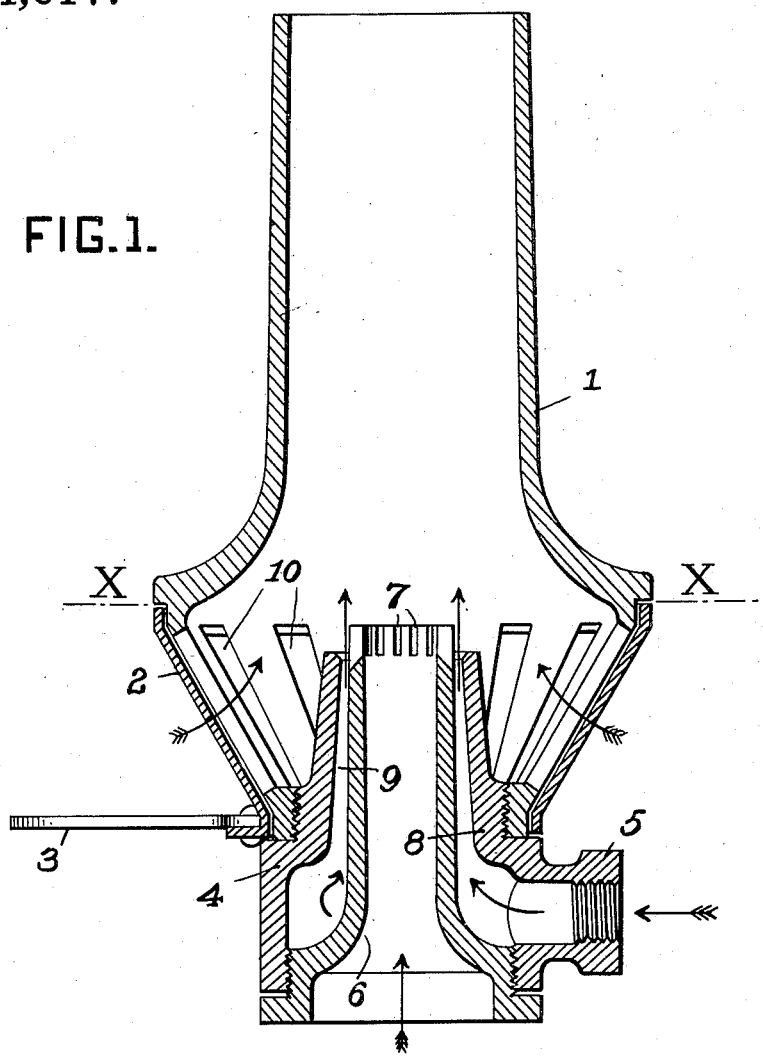
Figure 2:
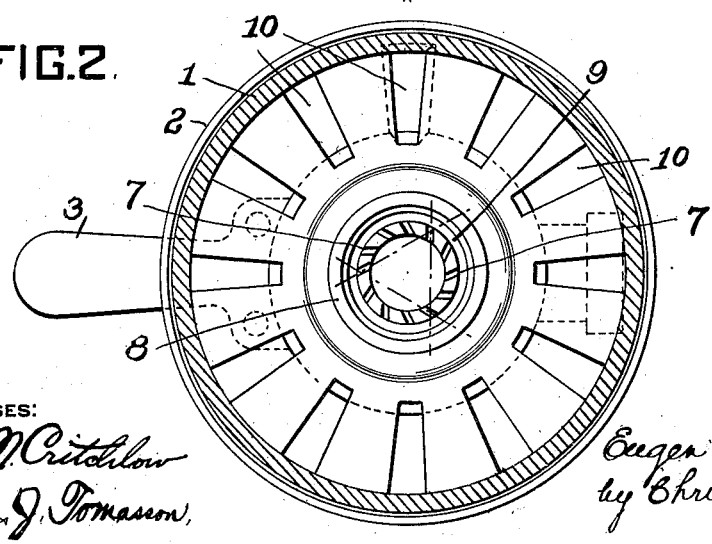

Figure 1 is a longitudinal section of the burner. Fig. 2 is a section at the line X—X of Fig. 1.

The nozzle —6— (Fig. 1) is screwed into a casting provided with the socket —5— which is connected with the gas conduit 8. The nozzle, which leads one stream of the combustion air into the mixing chamber, is divided into tongues on the end projecting into the mixing chamber by means of slits —7— oblique to the radius of the nozzle, but preferably parallel to the axes of the conduits. The nozzle —6— forms, at the inlet end with the main piece —4— of the casting, a gas-distributing chamber of annular cross section which forms with the mixing chamber a gas-leading channel —9— between the nozzles —8— and —6— reduced toward the mixing chamber. The nozzle —8— overpasses somewhat the bottom of the slits —7— and is provided with screw threads on the end adjacent to the main piece —4— of the casting, these threads bearing the lower end of the burner pipe —1— forming the mixing chamber. The mixing chamber has the form of a conical space, the broader part of which lies toward the flowing direction of the gas, and which is connected with the slightly reduced burner pipe by means of a wall carried out in the form of a body of revolution. On the wall of the mixing chamber air inlets —10— and the shutter or valve —2— are arranged, which latter may be adjusted by means of the handle —3— (Fig. 2).

The gas, flowing through the socket —5— into the gas distributing chamber, passes from that chamber uniformly distributed into the gas-leading channel —9—, and leaving same sucks the air from the socket —6— and the mixing chamber into the burner pipe. When the gas, flowing through the gas-leading channel —9—, arrives at the slits —7— the gas gets into a whirling motion caused by the form of the slits. The gas then induces both the outer and the inner air stream to whirl, thereby effecting a good combustible mixture. This mixing is highly promoted by that the slits lead the gas toward the center line of the burner so that one part of the gas mixed up with air in the inner stream breaks also through the gas stream of annular cross section and gets into the outer air stream.

Having now described my invention what I claim as new and desire to secure by Letters Patent is:

1. In a gas-burner, the combination of two open-ended, concentrically arranged pipes, the edge of the inner pipe being slit with a plurality of slits extending through the pipe-wall in planes oblique to a radius extending to each slit, and the outer pipe arranged with its edge opposite the slits in the end of said inner pipe.

2. In a gas-burner the combination of a casing of substantially the shape of two cones arranged base to base, a nozzle extending into said casing through one apex and substantially to the widest part of the chamber within said casing, a burner passageway in the opposite apex of the chamber, air ports in the conical wall adjacent the entering nozzle and a central air duct and a peripheral gas duct in said nozzle.

In testimony whereof I have signed my name to this specification in the presence of two subscribing witnesses.

EUGEN SZÖCS.

Witnesses:
E. STEPHEN KELEMEN,
JOHN J. RAND.